(No Model.)

G. L. & H. C. HART.
MANUFACTURE OF HOLLOW HANDLED IMPLEMENTS.

No. 414,215. Patented Nov. 5, 1889.

Witnesses.
John Edwards Jr.
W. H. Whiting.

Inventor.
George L. Hart.
Hubert C. Hart.
By James Shepard
Atty

UNITED STATES PATENT OFFICE.

GEORGE L. HART AND HUBERT C. HART, OF UNIONVILLE, CONNECTICUT.

MANUFACTURE OF HOLLOW-HANDLED IMPLEMENTS.

SPECIFICATION forming part of Letters Patent No. 414,215, dated November 5, 1889.

Application filed July 16, 1889. Serial No. 317,656. (No model.)

*To all whom it may concern:*

Be it known that we, GEORGE L. HART and HUBERT C. HART, both citizens of the United States, residing at Unionville, in the county of Hartford and State of Connecticut, have invented certain new and useful Improvements in the Manufacture of Hollow-Handled Implements, of which the following is a specification.

The invention relates to improvements in the manufacture of hollow-handled implements, and the chief object of the invention is economy in the process of manufacture.

Figure 1:
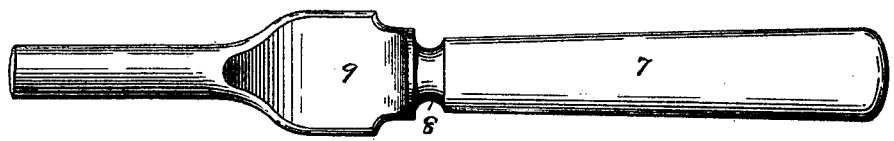
Figure 2:
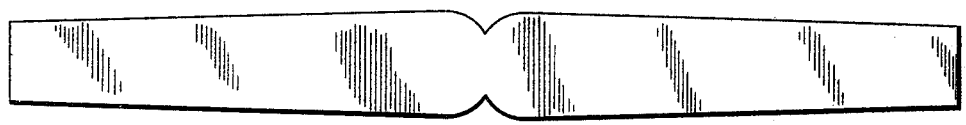
Figure 3:
Figure 4:
Figure 5:
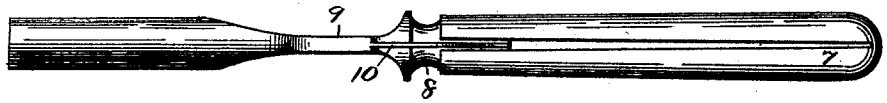
Figure 6:
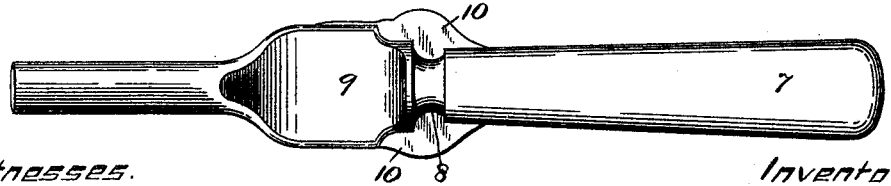

In the accompanying drawings, Figure 1 is side elevation of a knife handle and blade blank formed in accordance with said invention. Fig. 2 is a plan view of the blank for the handle. Fig. 3 is a like view of the same after having been subjected to swaging-dies. Fig. 4 is a longitudinal section on line *x x* of Fig. 3, and Figs. 5 and 6 are respectively an edge and side view of the assembled blade and handle blanks ready for the welding operation.

The blank, Fig. 2, may be readily formed by means of suitable dies, and consists, essentially, of two united blanks each of which is substantially of the contour of the desired handle, the same being united together at the larger or butt end. This blank is then struck by swaging-dies, so as to concave the two members thereof into the general form of half-handles, as shown in Figs. 3 and 4. The handle-blank, Figs. 3 and 4, is then bent over on the point of union, so as to bring the edges of the halves opposite each other into position for welding, as shown at the right-hand side of Figs. 5 and 6. These handles 7 are then placed upon the tang 8 of the blade-blanks 9, as shown in Figs. 5 and 6. In forging the tangs of the blade-blanks a fin or fins 10 are formed between the dies, which fins (or one of them at least) are left upon the tang and made to enter the seam between the abutting edges of the handle, all as shown in Figs. 5 and 6, thereby preventing the tang from twisting out of place during the subsequent operations of heating and welding. The assembled blanks are then heated and welded in forging-dies in any ordinary manner.

We claim as our invention—

1. That improvement in the manufacture of hollow-handled implements which consists in first forming a compound blank for the respective halves of the handles united to each other at the butt-end, then concaving this blank to form two half-handles, then bending transversely to the length of the blank at the junction of the compound blank to bring the opposite ends together, then placing said handle-blank upon the tang of the blade-blank and welding, substantially as described, and for the purpose specified.

2. In the process of manufacturing hollow-handled implements, the sub-process of securing the handles to the tangs, which consists of forming the handle with a longitudinal seam and the tang with a laterally-projecting fin, assembling the parts with the projecting fin in the seam of the handle, and then heating and welding, substantially as described, and for the purpose specified.

GEORGE L. HART.
HUBERT C. HART.

Witnesses:
GEORGE E. TAFT,
CHARLES E. HART.